United States Patent
Angello et al.

(10) Patent No.: US 7,680,231 B2
(45) Date of Patent: Mar. 16, 2010

(54) ADAPTIVE VARIABLE LENGTH PULSE SYNCHRONIZER

(75) Inventors: John E. Angello, Austin, TX (US);
Satyavathi Akella, Austin, TX (US);
Kiyoshi Kase, Austin, TX (US); May Len, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1012 days.

(21) Appl. No.: 11/349,874

(22) Filed: Feb. 8, 2006

(65) Prior Publication Data

US 2007/0183549 A1    Aug. 9, 2007

(51) Int. Cl.
*H04L 25/38* (2006.01)
(52) U.S. Cl. ..................................... 375/370
(58) Field of Classification Search ................ 327/141, 327/144; 375/354, 370
See application file for complete search history.

(56) References Cited

U.S. PATENT DOCUMENTS

| | | | |
|---|---|---|---|
| 4,353,032 A | | 10/1982 | Taylor |
| 4,973,860 A | * | 11/1990 | Ludwig ....................... 327/145 |
| 5,331,669 A | * | 7/1994 | Wang et al. .................. 375/371 |
| 5,373,508 A | * | 12/1994 | Guliani ........................ 714/712 |
| 5,654,988 A | | 8/1997 | Heyward et al. |
| 6,163,550 A | * | 12/2000 | Alston et al. ................. 370/503 |
| 6,771,099 B2 | * | 8/2004 | Cavazos et al. .............. 327/141 |
| 6,772,358 B1 | * | 8/2004 | Plessier et al. ............... 713/400 |

* cited by examiner

*Primary Examiner*—David C Payne
*Assistant Examiner*—Leon-Viet Q Nguyen
(74) *Attorney, Agent, or Firm*—Gary R. Stanford

(57) ABSTRACT

An adaptive variable length pulse synchronizer including a state keeper circuit, an asynchronous pulse edge detection circuit, a data synchronization circuit, and a pulse edge synchronization circuit. The state keeper circuit detects a leading edge of the asynchronous pulse. The asynchronous pulse edge detection circuit detects a trailing edge of the asynchronous pulse after the state keeper circuit has detected the leading edge. The asynchronous pulse edge detection circuit further provides a pulse synchronized with a clock signal after the asynchronous pulse has been detected. The data synchronization circuit latches the asynchronous data and provides the synchronous data in response to the synchronous pulse. The pulse edge synchronization provides the synchronous ready signal after synchronous data has been provided. In one embodiment, the synchronous pulse occurs between successive rising edges of the clock whereas the synchronous ready signal is provided in response to the intermediate falling edge of the clock.

18 Claims, 5 Drawing Sheets

ADAPTIVE VARIABLE LENGTH PULSE SYNCHRONIZER

BACKGROUND OF THE INVENTION

1. Field of the Invention

The present invention relates in general to data communications, and more specifically to a system and method which captures and synchronizes an asynchronous signal with unknown length and occurrence to a digital clock having any rate or a variable rate.

2. Description of the Related Art

The time that is needed to generate valid output data provided by an asynchronous analog block varies over process, voltage, and temperature. The output data provided by an asynchronous block must be synchronized with a digital logic clock signal in order for the data to be captured and stored correctly by the digital logic. The clock rate that is used by the digital logic to capture the analog output data, however, varies for different applications. Digital logic which uses a rigid synchronizer design is not able to guarantee capture of spurious and unpredictable analog data when used for different chips using different clock signals, processes, temperatures and voltages. A data ready indicator must be generated and sent to the digital block, and the digital logic that uses this analog data should see the output data earlier than the data ready indicator to provide sufficient setup time. Existing schemes are unable to ensure detection of an asynchronous pulse that is faster than the reference clock used by the digital logic.

It is desired to provide a system and method for capturing valid data provided by an asynchronous analog domain for use by a synchronous domain over a wide range of processes, voltages, temperatures, and clock frequencies, including detecting asynchronous pulses that are faster or slower than the reference clock used within the synchronous domain.

BRIEF DESCRIPTION OF THE DRAWINGS

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
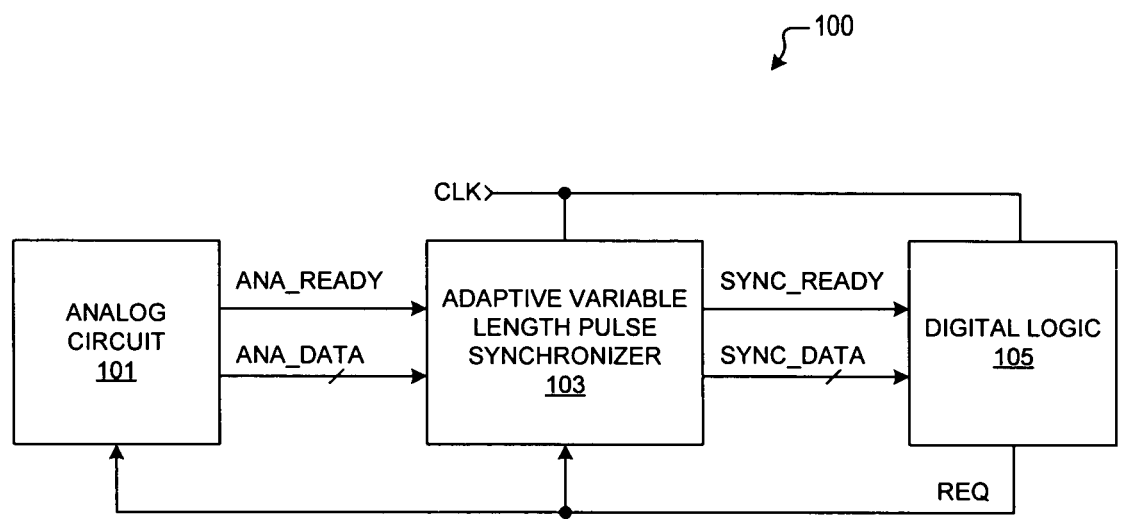
FIG. 1 is simplified block diagram of a communication system including an adaptive variable length pulse synchronizer implemented according to an embodiment of the present invention.

FIG. 1 is simplified block diagram of a communication system 100 including an adaptive variable length pulse synchronizer 103 implemented according to an embodiment of the present invention. An analog circuit 101 receives a data request signal referred to as REQ and provides an analog data ready signal ANA_READY and one or more analog data signals ANA_DATA. The ANA_DATA signals include one or more signals to be captured and stored or otherwise used by digital logic 105. The digital logic 105 provides the REQ signal when it is ready to receive the ANA_DATA signals into one or more internal registers (not shown). After receiving the REQ signal, the time that the analog circuit 101 needs to generate valid data on the ANA_DATA signals varies over process, voltage and temperature. The analog circuit 101 pulses the ANA_READY signal to indicate when the ANA_DATA signals are valid. In the embodiment illustrated, the ANA_READY signal is normally at a high logic level and is pulsed low and then high again by the analog circuit 101 when the ANA_DATA signals are valid. Thus, the pulse is generally asynchronous with a leading falling edge and a trailing rising edge. In an alternative embodiment, the pulse may be inverted with a leading rising edge and a trailing falling edge. The ANA_DATA signals are considered valid upon the trailing edge of the ANA_READY data ready pulse. Any other control signaling method is possible and contemplated (e.g., high pulse, edge-triggered, level-triggered, etc.).

The digital logic 105 employs a reference clock signal referred to as CLK which operates at a specified frequency or rate depending upon the particular application being implemented. The CLK signal may be a variable clock signal having a rate which varies over time or for different operating modes of the communication system 100. In many embodiments of the communication system 100, however, the rate of the CLK signal is fixed for each particular application and is variable only in the sense that it varies from one application to another. As noted above, the timing of the ANA_DATA and ANA_READY signals vary and generally have an unknown time of arrival. Also, the ANA_READY signal has an unknown or indeterminate pulse width. And further, the rate of the CLK signal varies from one application to the next. The adaptive variable length pulse synchronizer 103 detects the indeterminate data ready pulse, captures the corresponding ANA_DATA signals, and synchronizes the analog data to the synchronous domain of the CLK signal. The adaptive variable length pulse synchronizer 103 receives the ANA_READY, ANA_DATA, REQ and CLK signals and provides a synchronous ready signal SYNC_READY and synchronous data signals SYNC_DATA. In the embodiment illustrated, the SYNC_DATA signals are synchronized with the rising edge of the CLK signal. In the particular embodiment illustrated below, the SYNC_READY signal is synchronized half a cycle later after the rising edge of the CLK signal (e.g., the following falling edge) to provide sufficient setup time for the SYNC_DATA arriving at the registers of the digital logic 105 to be clocked by SYNC_READY. Thus, the adaptive variable length pulse synchronizer 103 captures unpredictable data and holds and transfers the data in a predictable manner regardless of when the data is provided by the analog circuit 101 and regardless of the rate of the CLK signal.

Figure 2:
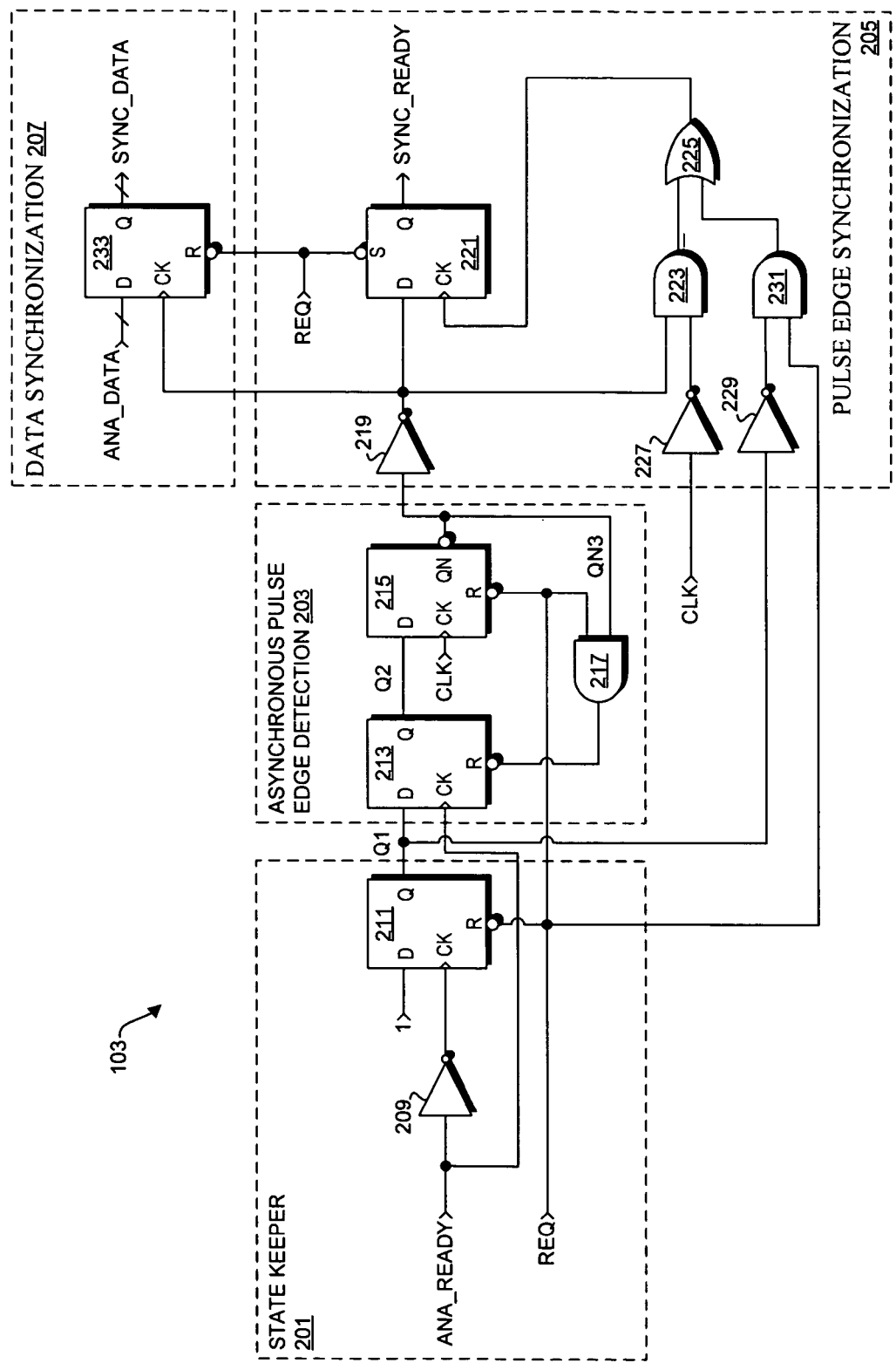
FIG. 2 is a schematic diagram of the adaptive variable length pulse synchronizer of FIG. 1 implemented according to an exemplary embodiment of the present invention.

FIG. 2 is a schematic diagram of the adaptive variable length pulse synchronizer 103 implemented according to an exemplary embodiment of the present invention. The adaptive variable length pulse synchronizer 103 includes a state keeper circuit 201, an asynchronous pulse edge detection circuit 203, a pulse edge synchronization circuit 205 and a data synchronization circuit 207. In the illustrated embodiment, the state keeper circuit 201 includes an inverter 209 and a D-type flip-flop (DFF) 211, the asynchronous pulse edge detection circuit 203 includes DFFs 213 and 215 and a two-input AND gate 217, the pulse edge synchronization circuit 205 includes inverters 219, 227 and 229, two-input AND gates 223 and 231, a two-input OR gate 225 and a DFF 221, and the data synchronization circuit 207 includes DFF 207.

The ANA_READY signal is provided to the input of an inverter 209 and to the clock (CK) input of the DFF 213. The output of the inverter 209 is coupled to the clock input of the DFF 211. A logic one ("1") is provided to the data (D) input of the DFF 211, and the non-inverted output (Q) of the DFF 211 generates a signal Q1 which is provided to the data input of the DFF 213 and to the input of the inverter 229. The REQ signal is provided to the reset (R) input of the DFFs 211, 215 and 233, to the set (S) input of DFF 221, to one input of the AND gate 217 and to one input of the AND gate 231. It is noted that "set" inputs may alternatively be referred to as "preset" inputs and that "reset" inputs may alternatively be referred to as "clear" inputs, and that all such DFF inputs are inverted unless otherwise indicated. The non-inverted output of the DFF 213 provides a signal Q2, which is provided to the data input of the DFF 215. The inverted output (QN) of the DFF 215 generates a signal QN3 which is provided to the input of the inverter 219 and to the other input of AND gate 217. The output of AND gate 217 is provided to the reset input of the DFF 213. The output of inverter 219 is coupled to the clock input of the DFF 233, to the data input of the DFF 221, and to one input of the AND gate 223. The CLK signal is provided to the clock input of the DFF 215 and to the input of the inverter 227. The output of the inverter 227 is provided to the other input of the AND gate 223, having its output coupled to one input of the OR gate 225. The output of the inverter 229 is coupled to the other input of the AND gate 231, having its output coupled to the other input of the OR gate 225. The output of the OR gate 225 is coupled to the clock input of the DFF 221. The non-inverted output of the DFF 221 provides the SYNC_READY signal. The ANA_DATA signal is shown provided to the data input of the DFF 233, having its non-inverted output providing the SYNC_DATA signal. It is understood that the DFF 233 is duplicated as many times as the number of signals of the ANA_DATA signals and the corresponding SYNC_DATA signals.

Figure 3:
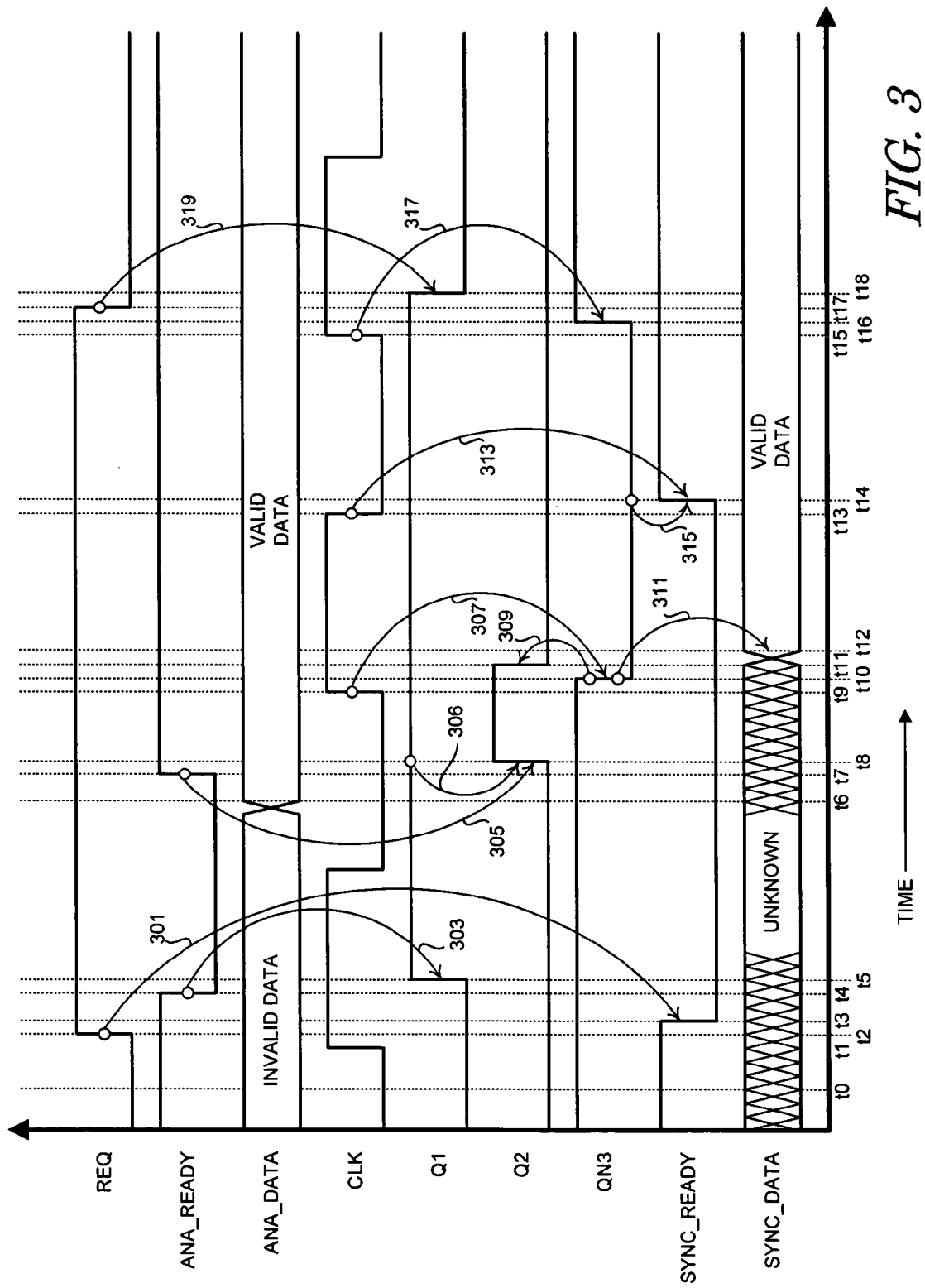
FIG. 3 is a timing diagram illustrating operation of the adaptive variable length pulse synchronizer of FIG. 1 according to an exemplary embodiment of the present invention.

FIG. 3 is a timing diagram illustrating operation of the adaptive variable length pulse synchronizer 103 according to an exemplary embodiment of the present invention. The signals REQ, ANA_READY, ANA_DATA, CLK, Q1, Q2, QN3, SYNC_READY and SYNC_DATA are shown plotted versus time. At an initial time t0, the REQ signal is low, the ANA_READY signal is in its normally high state and the ANA_DATA signals are unknown or otherwise in an invalid state and providing invalid data. The CLK signal is initially low at time t0 (although it could be high or low). The CLK signal normally toggles according to a predetermined frequency, although the CLK signal is not restricted to a fixed frequency. The Q1 and Q2 signals are initially low and the QN3 signal is initially high. The SYNC_READY signal is held high by the DFF 221 since its set input is held low by the REQ signal. The SYNC_DATA signals are initially in an unknown state.

At a subsequent time t1, the CLK signal goes high. In the embodiment shown, a circuit or logic (not shown) within the digital logic 105 asserts the REQ signal high at a subsequent time t2 in response to the CLK signal going high in accordance with synchronous operation. It is appreciated by those of ordinary skill in the art, however, that the REQ signal may be asserted high at any time and not necessarily synchronous with the CLK signal. The REQ signal indicates a read request by the digital logic 105 for data from the analog circuit 101. Since the REQ signal and the output of the inverter 219 are initially low, the outputs of the AND gates 223 and 231 are initially low so that the output of the OR gate is also low. The rising edge of the REQ signal causes the AND gate 231 to pull its output high, which causes the OR gate 225 to pull its output high thereby clocking the DFF 221 while the output of the inverter 219 is still low. And since the REQ signal is no longer forcing the output of the DFF 221 high, the DFF 221 pulls the SYNC_READY low at subsequent time t3. Thus, the rising edge of the REQ signal causes the SYNC_READY signal to be pulled low as indicated by arrow 301. At subsequent time t4, the analog circuit 101, in response to the REQ signal going high, asynchronously pulses the ANA_READY signal low to indicate that it is ready to provide valid data on the ANA_DATA signals. The ANA_READY signal going low causes the inverter 209 to pull the clock input of the DFF 211 high thereby clocking a logic 1 to its non-inverted output on the Q1 signal. Thus, at a subsequent time t5 after a short delay through the inverter 209 and the DFF 211, the Q1 signal goes high in response to the ANA_READY signal as indicated by arrow 303. In this manner, the state keeper circuit 201 latches the leading edge of the ANA_READY signal. It is noted that the leading edge of the ANA_READY signal can occur any time after the REQ signal is asserted high.

While the ANA_READY signal is low, the analog circuit 101 asynchronously provides valid data on the ANA_DATA signal lines. This is shown occurring at about time t6, which is shown after the CLK signal going back low. It is noted, however, that the valid data may occur any time before or after this point while the ANA_READY signal is low. At a subsequent time t7, the analog circuit 101 asynchronously asserts the ANA_READY signal high again indicating that valid data is provided on the ANA_DATA signal lines. After a short delay through the DFF 213 at a time t8, the Q2 signal at the output of the DFF 213 goes high (in response to the ANA_READY signal as indicated by arrow 305) thereby effectively latching the output of the state keeper circuit 201 as indicated by arrow 306. At a subsequent time t9, the next rising edge of the CLK signal occurs to clock the DFF 215, which pulls the QN3 signal low at a subsequent time t10 and as indicated by arrow 307. At this time, the asynchronous pulse on the ANA_READY signal is effectively transferred to the clock domain on the QN3 signal, which is synchronized with the CLK signal. After a short delay through the AND gate 217, the DFF 213 is reset by the QN3 signal so that the Q2 signal low at time t11 as indicated by arrow 309. The reset of the Q2 signal prevents multiple reads from occurring during the same block access. Also, when QN3 is pulled low, the output of the inverter 219 goes high clocking the DFF 233 to latch the ANA_DATA signals to the SYNC_DATA signals at about time t12 as indicated by arrow 311. Thus, after a delay through the inverter 219 and the DFF 233, the valid data on the ANA_DATA signals is transferred to the SYNC_DATA signals, which is before the SYNC_READY signal is pulled high again. In this manner, the data from the analog circuit 101 is provided to the digital logic 105 before the data ready indicator is asserted (e.g., the rising edge of the SYNC_READY signal), which provides sufficient setup time for the digital logic 105.

Just before the CLK signal went high at time t9, the QN3 signal was high so that the output of the inverter 219 was low keeping the output of the AND gate 223 low. When the CLK signal was asserted high at time t9, the output of the inverter 229 was asserted low before the output of the inverter 219 was asserted high (because of the extra delay through the DFF 215). In this manner, even though the output of the inverter 219 went high in response to the QN3 signal going low, the output of the AND gate 223 remains low. At subsequent time t13, the CLK signal goes back low and since the output of the inverter 219 is still high at this time, the output of the AND gate 223 goes high causing the OR gate 225 to assert its output high to clock the DFF 221. Thus, the state of QN3, after being inverted through the inverter 219, is clocked to the output of the DFF 221 pulling the SYNC_READY ready signal high at subsequent time t14 as indicated by arrows 313 and 315. The rising edge of the SYNC_READY signal indicates to the digital logic 105 that valid data is available on the SYNC_DATA signals.

At subsequent time t15, the CLK signal goes back high and since Q2 is low at this time, the DFF 215 pulls the QN3 signal high at subsequent time T16 as indicated by arrow 317. The "pulse" on the QN3 signal between times t10 and t16 represents a synchronized version of the asynchronous pulse on the ANA_SYNC signal between times t4 and t7. Also, the digital logic 105 (e.g., in response to the CLK signal going high at time t15) pulls the REQ signal low again at time t17, which resets the DFF 211 and pulls the Q1 signal back low at time t18 as indicated by arrow 319. The state of the adaptive variable length pulse synchronizer 103 is returned to its initial state, which is the same state at time t0, so that it is ready to capture additional asynchronous analog data if necessary.

It is appreciated that the adaptive variable length pulse synchronizer 103 is generally held in an initial or reset state while the REQ signal is low. The DFFs 211, 213, 215 and 233 are held in their reset (or cleared) states whereas the DFF 221 is held in its set (or preset) state while REQ is low. When the REQ signal is asserted high by the digital logic 105, the adaptive variable length pulse synchronizer 103 transitions to an enabled state. In particular, the DFFs 211, 213, 215, 221 and 233 are no longer held in a particular state. Also, as indicated by the arrow 301 in FIG. 3, first timing logic within the pulse edge synchronization circuit 205 clocks a low logic level through the DFF 221 to initialize the SYNC_READY low. In particular, the inverter 229 and the AND gate 231 provide a positive edge provided through the OR gate 225 in response to the rising edge of REQ. As soon as the leading edge of the ANA_READY signal is received, Q1 goes high as indicated by arrow 303 and remains high until the REQ signal is pulled back low at the end of the read request. This keeps the output of the AND gate 231 low to prevent premature re-clocking the DFF 221. When the SYNC_READY signal is subsequently asserted high, the digital logic 105 is informed that the data is available to be read. The state keeper circuit 201 generally detects and latches the leading edge of the asynchronous pulse on the ANA_READY signal. As illustrated, an arbitrary logic state (e.g., a high logic state) is latched by the DFF 211 in response to the leading edge of the asynchronous pulse and output as the Q1 signal. The first part of the asynchronous pulse edge detection circuit 203 (e.g., the DFF 213) detects and latches the trailing edge of the asynchronous pulse. As illustrated, the logic state of Q1 is latched as Q2 by the DFF 213 when clocked by the trailing edge of the asynchronous pulse as shown by arrows 305 and 306.

The inverter 209 and the DFF 211 of the state keeper circuit 201 are exceedingly fast and not limited by the frequency of the CLK signal. Any pulse on the ANA_READY signal is detected as long as the trailing edge of the pulse does not occur prior to the very minimal delay through the inverter 209 and the DFF 211. And the pulse may be exceedingly long without any danger of latching invalid data since the DFF 213 of the asynchronous pulse edge detection circuit 203 is only responsive to the trailing edge of the asynchronous pulse. And once the pulse is effectively captured by the DFF 213, it is held as long as it takes for the next active edge (e.g., rising edge) of the CLK signal.

Once Q2 is latched, the asynchronous pulse edge detection circuit 203 converts the asynchronous pulse to a synchronous pulse through operation of the DFF 215. In particular, the very next rising edge of CLK clocks the state of Q2 to the output of the DFF 215, shown as QN3, as indicated by arrow 307. The QN3 signal is the synchronous pulse as shown occurring between times t10 and t16 of FIG. 3. The DFF 215 is selected with an inverted output since it is desired that the pulse on QN3 be active low in the particular embodiment illustrated. As described below with reference to FIG. 5, however, a synchronous pulse with an active high state may also be employed. The leading edge of the synchronous pulse resets the state of Q2 as shown by arrow 309 via operation of the AND gate 217 to prevent multiple reads from occurring during the same block access as previously described. Clearing Q2 also enables the DFF 215 to terminate the synchronous pulse upon the next "active" or in this case, the next rising edge of CLK occurring at time t15.

The data synchronization circuit 207 latches the asynchronous analog data to the synchronous data in response to the leading edge of the synchronous pulse as indicated by arrow 311. The inverter 219 provides a rising leading edge which clocks the DFF 233 to latch the data. The inverter 227 and the AND gate 223 of the pulse edge synchronization circuit 205 convert the next falling edge of the CLK signal to a rising edge at the output of the OR gate 225 to clock the state of the inverter 219 to the SYNC_READY signal as shown by arrows 313 and 315. Note that the output of the inverter 219 remains high (while the synchronous pulse is low) between the consecutive rising edges of CLK. In this manner, this logic forms second timing logic which generates the rising edge of the SYNC_READY signal after the leading edge but before the trailing edge of the synchronous pulse (e.g., mid-way through the synchronous pulse). Since the data is latched through the DFF 233 at the beginning of the synchronous pulse, the pulse timing logic provides sufficient setup time for the output data before the data ready indicator is provided. The synchronous pulse is terminated in response to the next rising edge of the CLK signal as shown by arrow 317. And the adaptive variable length pulse synchronizer 103 is returned to its initial reset state when the REQ signal is pulled back low as indicated by arrow 319.

Figure 4:
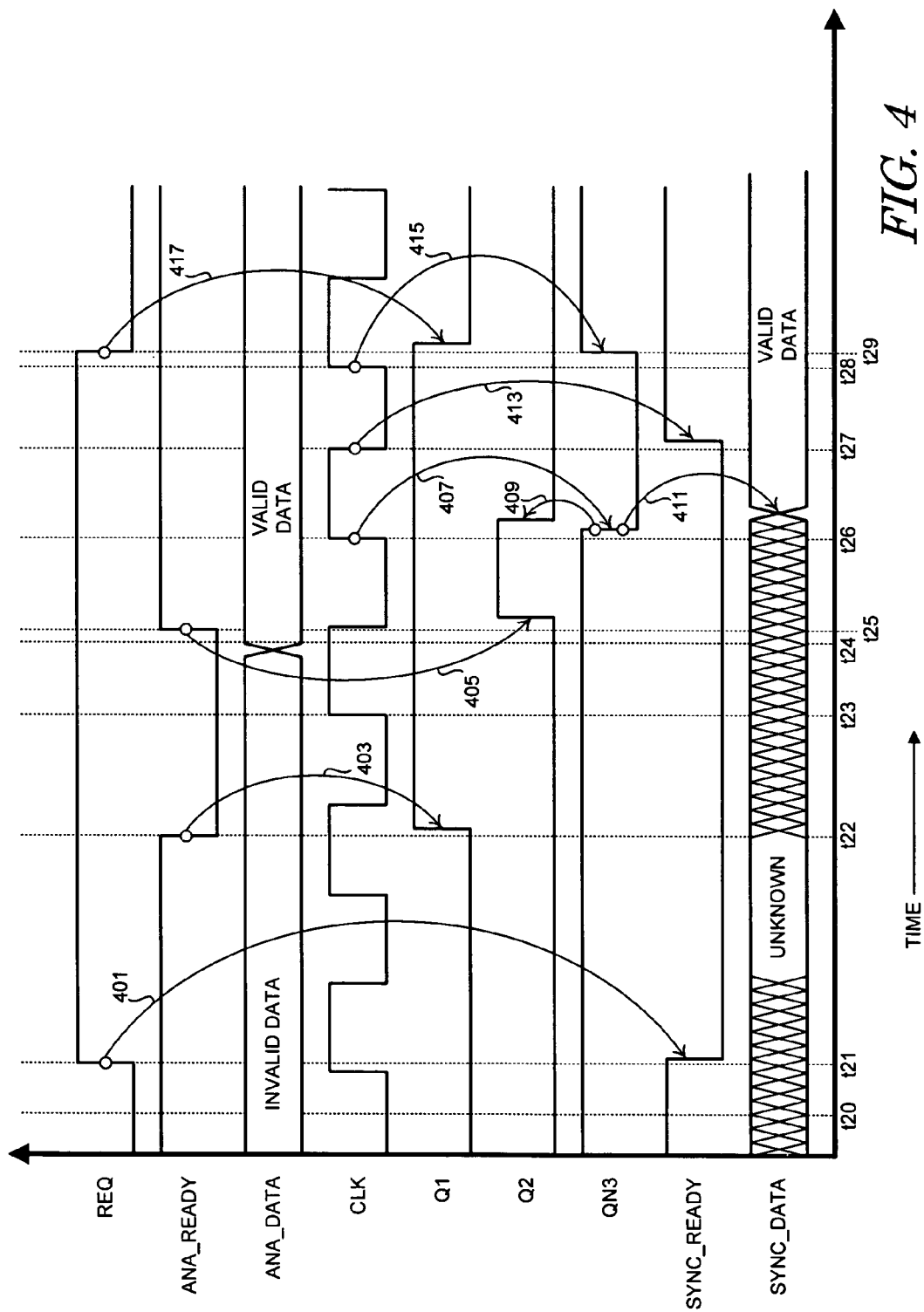
FIG. 4 is another timing illustrating operation of the adaptive variable length pulse synchronizer of FIG. 1 according to an exemplary embodiment of the present invention for a slower asynchronous signal.

FIG. 4 is another timing illustrating operation of the adaptive variable length pulse synchronizer 103 according to an exemplary embodiment of the present invention for a slower asynchronous signal. The timing diagram of FIG. 4 also shows the REQ, ANA_READY, ANA_DATA, CLK, Q1, Q2, QN3, SYNC_READY and SYNC_DATA plotted versus time in a similar manner as FIG. 3. In this case, the asynchronous pulse on the ANA_READY signal is almost twice as long and endures past a next rising edge of CLK. At an initial time t20, the signals are essentially the same as those shown in FIG. 3. At subsequent time t21, the REQ signal goes high, which causes the SYNC_READY signal to go low as indicated by arrow 401. The ANA_READY signal goes low at subsequent time t22 and the state keeper circuit 201 responds by asserting the Q1 signal high as indicated by arrow 403. In this case, the pulse on the ANA_READY signal is relatively slow and the ANA_READY signal is still low upon the next rising edge of the CLK signal at time t23. Yet since the ANA_READY signal clocks the DFF 213, the length of the pulse on the ANA_READY signal is inconsequential and may be any length without negatively impacting circuit operation.

The analog circuit 101 eventually provides valid data on the ANA_DATA signals at time t24 and the ANA_READY signal is asserted at subsequent time t25. The Q2 signal is asserted high in response to the ANA_READY signal going high as shown by arrow 405. The next rising edge of the CLK signal at time t26 clocks the Q1 signal through the DFF 215, which pulls the QN3 signal low as indicated by arrow 407. The QN3 signal going low resets the Q2 signal low as indicated by arrow 409. The output of the inverter 219 goes high to clock the DFF 233 so that the ANA_DATA signals are transferred to the SYNC_DATA signals as indicated by arrow 411. The next falling edge of the CLK signal at time t27 causes the DFF 221 to be clocked (via inverter 227 and gates 223, 225) so that the SYNC_READY signal is pulled high again as indicated by arrow 413. The next rising edge of the CLK signal at time t28 clocks the reset Q2 signal through the DFF 215 so that the QN3 signal is pulled high again as indicated by arrow 415. And finally, the digital logic 105 pulls the REQ signal back low at time t29, which resets the DFF 211 pulls the Q1 signal back low again as indicated by the arrow 417.

It is noted that a potential race condition exists between the asynchronous rising edge of the ANA_READY signal clocking the DFF 213 to transfer the Q1 signal to the Q2 signal and the rising edge of the CLK signal clocking the DFF 215 to transfer the Q2 signal to the QN3 signal. With reference to FIG. 4, for example, consider the situation in which the rising edge of the ANA_READY signal occurring at time t25 is delayed until just before the rising edge of the CLK signal at time t26. The DFF 215 may or may not catch the high state of the Q2 signal by the time it the DFF 215 is clocked by the CLK signal. This potential race condition is inconsequential, however, and does not affect operation. The DFF 215 sees the Q2 signal high or low at each rising edge of the CLK signal. If the Q2 signal does not rise in time to be caught by the DFF 215, then the Q2 signal simply remains high and the DFF 215 detects the high level of Q2 at the next rising edge of the CLK signal. If the Q2 signal does rise in time, then the QN3 signal is pulled low and the Q2 signal exhibits a very short duration pulse. Either way, the asynchronous pulse on the ANA_READY signal is properly transferred to the clock domain.

Figure 5:
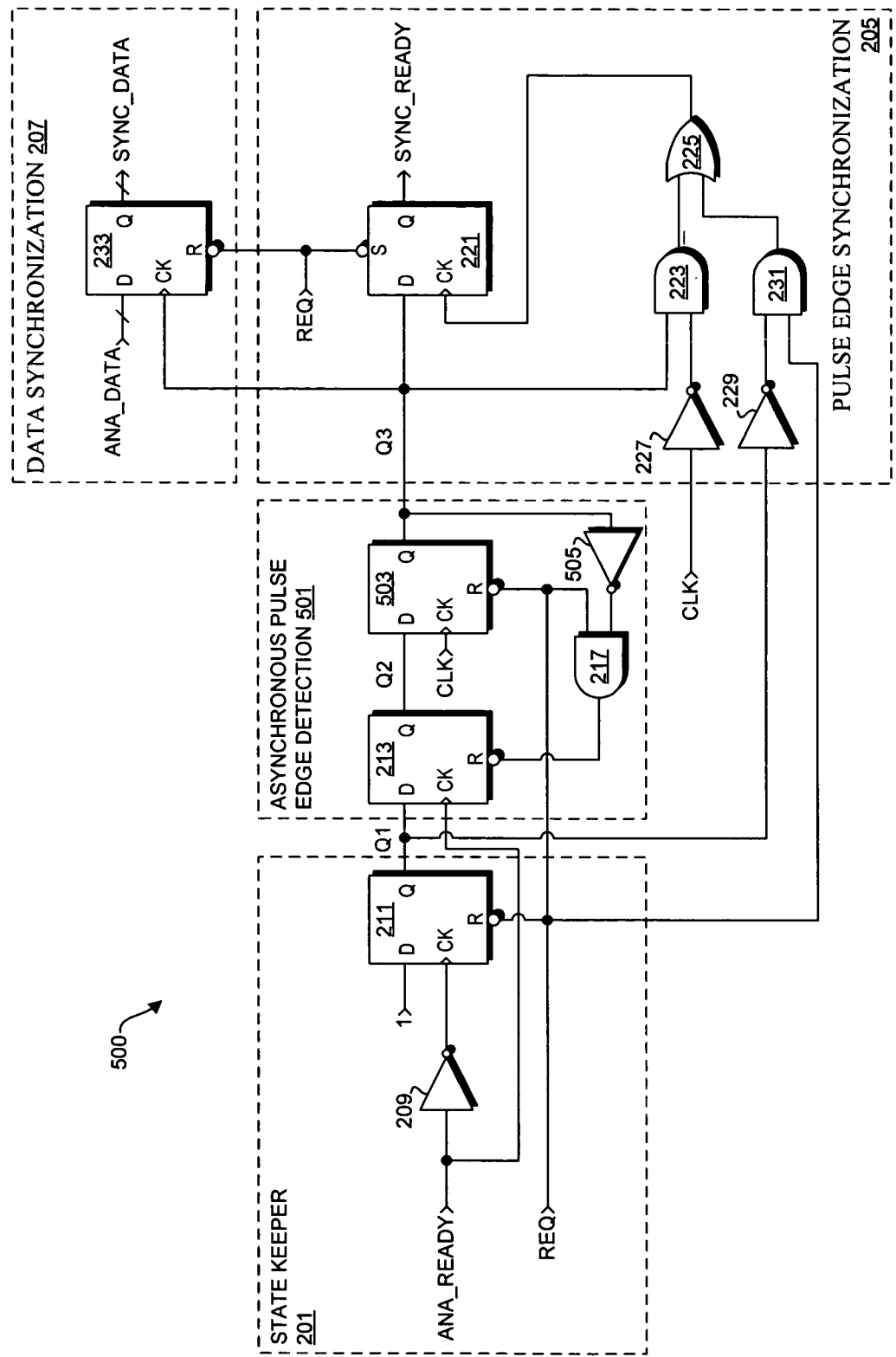
FIG. 5 is a schematic diagram of the adaptive variable length pulse synchronizer implemented according to an alternative embodiment of the present invention.

FIG. 5 is a schematic diagram of the adaptive variable length pulse synchronizer 500 implemented according to an alternative embodiment of the present invention. The synchronizer 500 is substantially similar to the synchronizer 103 in which similar devices and components assume identical reference numbers. In this case, the asynchronous pulse edge detection circuit 203 is replaced with a similar asynchronous pulse edge detection circuit 501, in which the DFF 215 is replaced with a similar DFF 503 having a non-inverted (Q) rather than an inverted output (QN). In this manner, the DFF 503 generates an active high synchronous pulse Q3 rather than the active low pulse QN3. Since the inverter 219 is also eliminated, operation within the pulse edge synchronization circuit 205 is substantially identical (with the possible exception that the pulse on Q3 is faster than the inverted QN3 pulse since the delay of the inverter 219 is eliminated). Also, an inverter 505 is added having its input receiving the Q3 signal and its output provided to one input of the AND gate 217 to maintain proper logic operation. Operation of the synchronizer 500 is substantially identical to the synchronizer 103 other than minor timing differences, so that the synchronizer 103 may be replaced by the synchronizer 500 in suitable configurations. In yet another embodiment (not shown), the DFF 503 may include an inverted output (in addition to the non-inverted output) which is provided to the input of the AND gate 217 to eliminate the inverter 505. As understood by those skilled in the art, however, a DFF with dual outputs consumes a greater amount of additional space on the underlying integrated circuit than the added inverter 505, so that it is preferable to employ DFFs with single-ended outputs.

An adaptive variable length pulse synchronizer according to an embodiment of the present invention detects an asynchronous pulse in response to a request signal and captures corresponding asynchronous data. The adaptive variable length pulse synchronizer includes a state keeper circuit, an asynchronous pulse edge detection circuit, a data synchronization circuit, and a pulse edge synchronization circuit. The state keeper circuit transitions to a first logic state upon detection of a leading edge of the asynchronous pulse. The asynchronous pulse edge detection circuit transitions to a second logic state in response to a trailing edge of the asynchronous pulse if the state keeper circuit is in the first logic state. The asynchronous pulse edge detection circuit further provides a synchronous pulse when in the second logic state. The data synchronization circuit latches the asynchronous data and provides the synchronous data in response to a leading edge of the synchronous pulse. The pulse edge synchronization circuit provides the synchronous ready signal after the leading edge of the synchronous pulse and before a trailing edge of the synchronous pulse.

The state keeper circuit may include a first flip-flop having a data input for receiving the asynchronous pulse and an output which transitions to the first logic state in response to the leading edge of the asynchronous pulse. The asynchronous pulse edge detection circuit may include a second flip-flop having a data input coupled to the output of the first flip-flop, a clock input for receiving the asynchronous pulse and an output which transitions to the second logic state upon a trailing edge of the asynchronous pulse. The asynchronous pulse edge detection circuit may further include a third flip-flop having an input coupled to the output of the second flip-flop, a clock input receiving the clock signal, and an output which provides the synchronous pulse in response to the output of the second flip-flop being in the second logic state and upon successive active edges of the clock signal. The asynchronous pulse edge detection circuit may further include a logic gate having a first input coupled to the output of the third-flip flop, a second input for receiving the request signal, and an output coupled to a reset input of the second flip-flop. The data synchronization circuit may include a flip-flop having a data input for receiving the asynchronous data, an output providing the synchronous data, and a clock input receiving the synchronous pulse.

The asynchronous pulse edge detection circuit may provide the leading and the trailing edges of the synchronous pulse in response to the clock signal transitioning from a first level to a second level. In this case, pulse edge synchronization circuit may include a flip-flop and first logic. The flip-flop has a data input receiving the synchronous pulse, a clock input and an output providing the synchronous ready signal. The first logic has a first input receiving the clock signal, a second input receiving the synchronous pulse and an output coupled to the clock input of the flip-flop. In this manner, the first logic clocks the flip-flop when the clock signal transitions from the second level to the first level. The flip-flop may further include a set input for receiving the request signal. The pulse edge synchronization circuit may include second logic having a first input for receiving the request signal, a second input coupled to the output of the state keeper circuit, and an output coupled to the clock input of the flip-flop.

An adaptive pulse synchronizer according to an embodiment of the present invention includes four latch circuits and pulse timing logic. The first inverter has an input receiving an asynchronous pulse and an output. The first latch circuit has a data input receiving a predetermined logic state, a clock input receiving an asynchronous pulse, a reset input receiving a request signal, and an output. The second latch circuit has a data input coupled to the output of the first latch circuit, a first clock input receiving the asynchronous pulse, a second clock input receiving a synchronous clock signal, a reset input receiving the request signal, and an output providing a synchronous pulse. The third latch circuit has a data input receiving the synchronous pulse, a set input receiving the request signal, a clock input, and an output providing a synchronous ready signal. The fourth latch circuit has a data input receiving asynchronous data, an output providing synchronous data, a clock input receiving the synchronous pulse, and a reset input receiving the request signal. The pulse timing logic has a first input receiving the synchronous pulse, a second input receiving the clock signal, a third input coupled to the output of the first latch circuit, a fourth input receiving the request signal, and an output coupled to the clock input of the fourth latch.

In one embodiment of the adaptive pulse synchronizer, the second latch circuit includes a first and second latches and a logic gate. The first latch has a data input coupled to the output of the first latch circuit, a clock input receiving the asynchronous pulse, a reset input, and an output. The second latch has a data input coupled to the output of the first latch, a clock input receiving the clock signal, a reset input receiving the request signal, and an output providing the synchronous pulse. The logic gate has a first input receiving the request signal, a second input receiving the synchronous pulse, and an output coupled to the reset input of the first latch. In one embodiment, the logic gate is an AND gate having its second input coupled to the inverted output of the second latch. Also, an inverter may be included which has an input coupled to the inverted output of the second latch and an output providing the synchronous pulse.

The pulse timing logic may include first and second inverters, first and second AND gates, and an OR gate. The first inverter has an input receiving the clock signal and an output. The first AND gate has a first input receiving the synchronous pulse, a second input coupled to the output of the first inverter, and an output. The second inverter has an input coupled to the output of the first latch circuit and an output. The second AND gate has a first input coupled to the output of the second inverter, a second input receiving the request signal, and an output. The OR gate has a first input coupled to the output of the first AND gate, a second input coupled to the output of the second AND gate, and an output coupled to the clock input of the third latch circuit.

The latch circuits may be implemented with D-type flip-flops. The fourth latch circuit may be implemented with multiple latches, each having a data input receiving a corresponding asynchronous data signal, an output providing a corresponding synchronous data signals, a clock input receiving the synchronous pulse, and a reset input receiving the request signal.

A method of capturing and synchronizing asynchronous information for a digital circuit which provides a request signal according to an embodiment of the present invention includes latching an asynchronous ready signal, providing a synchronous pulse in response to a clock signal after latching the asynchronous ready signal, latching an asynchronous data input to a synchronous data output in response to the synchronous pulse being provided, and asserting a synchronous ready signal after the asynchronous data input is latched to the synchronous data output.

The method may include asserting a first logic signal in response to a leading edge of the asynchronous ready signal and asserting a second logic signal in response to a trailing edge of the asynchronous signal if the first logic signal has been asserted. The method may include providing a leading edge of a synchronous pulse in response to a clock signal if the second logic signal has been asserted and providing a trailing edge of the synchronous pulse in response to the clock signal. The method may include negating the second logic signal in response to the leading edge of the synchronous pulse being provided. The method may include providing the leading edge of the synchronous pulse in response to the clock signal transitioning from a first level to a second level when the second logic signal has been asserted, and providing the trailing edge of the synchronous pulse in response to the clock signal transitioning from the first level to the second level when the second logic signal has been negated. The method may include asserting the synchronous ready signal in response to the clock signal transitioning from the second level to the first level during the synchronous pulse. The method may include preventing the first logic signal and the second logic signal from being asserted before the request signal is provided, preventing the leading and trailing edges of the synchronous pulse from being provided before the request signal is provided, and preventing the latching of the asynchronous data input to the synchronous data output before the request signal is provided.

While particular embodiments of the present invention have been shown and described, it will be recognized to those skilled in the art that, based upon the teachings herein, further changes and modifications may be made without departing from this invention and its broader aspects. For example, particular logic states may be inverted (inverse logic) according to positive or negative logic. Also, the active or rising edge transition devices may be replaced with falling edge transition devices. The D-type flip-flops may be replaced with similar type storage devices, such as clocked data latches, J-K flip-flops, S-R flip-flops, and similar multivibrator (bi-stable or monostable) devices with appropriate supporting circuitry and logic as understood by those skilled in the art. The particular logic gates shown are for purposes of illustration and may be replaced by different logic performing similar functions. The appended claims are intended to encompass within their scope all such changes and modifications as are within the true spirit and scope of this invention.

What is claimed is:

1. An adaptive variable length pulse synchronizer which detects an asynchronous pulse in response to a request signal and which captures corresponding asynchronous data, said adaptive variable length pulse synchronizer comprising:

a state keeper circuit which transitions a first signal to a first logic state upon detection of a leading edge of the asynchronous pulse when the request signal is provided and which keeps said first signal in said first logic state while the request signal is provided;

an asynchronous pulse edge detection circuit which transitions a second signal to a second logic state in response to a trailing edge of the asynchronous pulse if said first signal is in said first logic state, and which provides a synchronous pulse synchronized with a clock signal when said second signal is in said second logic state;

a data synchronization circuit which latches the asynchronous data and provides said synchronous data in response to a leading edge of said synchronous pulse; and a pulse edge synchronization circuit which provides a synchronous ready signal after a leading edge of said synchronous pulse and before a trailing edge of said synchronous pulse.

2. The adaptive variable length pulse synchronizer of claim 1, wherein said state keeper circuit comprises a first flip-flop having a clock input for receiving the asynchronous pulse and an output which transitions to said first logic state in response to said leading edge of the asynchronous pulse, and wherein said asynchronous pulse edge detection circuit comprises a second flip-flop having a data input coupled to said output of said first flip-flop, a clock input for receiving the asynchronous pulse and an output which transitions to said second logic state upon a trailing edge of the asynchronous pulse.

3. The adaptive variable length pulse synchronizer of claim 2, wherein said asynchronous pulse edge detection circuit comprises a third flip-flop having a data input coupled to said output of said second flip-flop, a clock input receiving said clock signal, and an output which provides said synchronous pulse in response to said output of said second flip-flop being in said second logic state and upon successive active edges of said clock signal.

4. The adaptive variable length pulse synchronizer of claim 3, wherein said asynchronous pulse edge detection circuit comprises a logic gate having a first input coupled to said output of said third-flip flop, a second input for receiving the request signal, and an output coupled to a reset input of said second flip-flop.

5. The adaptive variable length pulse synchronizer of claim 1, wherein said data synchronization circuit comprises a flip-flop having a data input for receiving the asynchronous data, an output providing said synchronous data, and a clock input receiving said synchronous pulse.

6. The adaptive variable length pulse synchronizer of claim 1, wherein:

said asynchronous pulse edge detection circuit provides said leading edge and said trailing edge of said synchronous pulse in response to said clock signal transitioning from a first level to a second level; and wherein said pulse edge synchronization circuit comprises:
a flip-flop having a data input receiving said synchronous pulse, a clock input, and an output providing said synchronous ready signal; and
first timing logic having a first input receiving said clock signal, a second input receiving said synchronous pulse and an output coupled to said clock input of said flip-flop, wherein said first logic clocks said flip-flop when said clock signal transitions from said second level to said first level.

7. The adaptive variable length pulse synchronizer of claim 6, wherein:
said flip-flop includes a set input for receiving the request signal; and
wherein said pulse edge synchronization circuit comprises second timing logic having a first input for receiving the request signal, a second input coupled to said output of said state keeper circuit, and an output coupled to said clock input of said flip-flop.

8. The adaptive variable length pulse synchronizer of claim 1, wherein said state keeper circuit, said asynchronous pulse edge detection circuit, said data synchronization circuit and said pulse edge synchronization circuit are held in an initial state while the request signal is not provided and wherein said state keeper circuit, said asynchronous pulse edge detection circuit, said data synchronization circuit and said pulse edge synchronization circuit each transition to a ready state when said request signal is provided.

9. An adaptive pulse synchronizer, comprising:
a first latch circuit having a data input receiving a fixed logic state, a clock input receiving an asynchronous pulse, a reset input receiving a request signal, and an output;

a second latch circuit having a data input coupled to said output of said first latch circuit, a first clock input receiving said asynchronous pulse, a second clock input receiving a synchronous clock signal, a reset input receiving said request signal, and an output providing a synchronous pulse;

a third latch circuit having a data input receiving said synchronous pulse, a set input receiving said request signal, a clock input, and an output providing a synchronous ready signal;

a fourth latch circuit having a data input receiving asynchronous data, an output providing synchronous data, a clock input receiving said synchronous pulse, and a reset input receiving said request signal; and pulse timing logic having a first input receiving said synchronous pulse, a second input receiving said clock signal, a third input coupled to said output of said first latch circuit, a fourth input receiving said request signal, and an output coupled to said clock input of said third latch circuit.

10. The adaptive pulse synchronizer of claim 9, wherein said second latch circuit comprises:
a first latch having a data input coupled to said output of said first latch circuit, a clock input receiving said asynchronous pulse, a reset input, and an output;
a second latch having a data input coupled to said output of said first latch, a clock input receiving said clock signal, a reset input receiving said request signal, and an output providing said synchronous pulse; and
a logic gate having a first input receiving said request signal, a second input receiving said synchronous pulse, and an output coupled to said reset input of said first latch.

11. The adaptive pulse synchronizer of claim 9, wherein said pulse timing logic comprises:
a first inverter having an input receiving said clock signal and an output;
a first AND gate having a first input receiving said synchronous pulse, a second input coupled to said output of said first inverter, and an output;
a second inverter having an input coupled to said output of said first latch circuit and an output;
a second AND gate having a first input coupled to said output of said second inverter, a second input receiving said request signal, and an output; and
an OR gate having a first input coupled to said output of said first AND gate, a second input coupled to said output of said second AND gate, and an output coupled to said clock input of said third latch circuit.

12. The adaptive pulse synchronizer of claim 9, wherein said first, second, third, and fourth latch circuits each comprise at least one D-type flip-flop.

13. The adaptive pulse synchronizer of claim 9, wherein said fourth latch circuit comprises a plurality of latches, each having a data input receiving a corresponding one of a plurality of asynchronous data signals, an output providing a corresponding one of a plurality of synchronous data signals, a clock input receiving said synchronous pulse, and a reset input receiving said request signal.

14. A method of operating an adaptive pulse synchronizer for capturing and synchronizing asynchronous information for a digital circuit which provides a request signal, comprising:
- asserting, by the adaptive pulse synchronizer, a first logic signal in response to a leading edge of an asynchronous ready signal only when the request signal is provided and keeping the first logic signal asserted while the request signal is provided;
- asserting, by the adaptive pulse synchronizer, a second logic signal in response to a trailing edge of the asynchronous ready signal if the first logic signal has been asserted;
- providing, by the adaptive pulse synchronizer, a leading edge of a synchronous pulse in response to a clock signal if the second logic signal has been asserted;
- providing, by the adaptive pulse synchronizer, a trailing edge of the synchronous pulse in response to the clock signal;
- latching, by the adaptive pulse synchronizer, an asynchronous data input to a synchronous data output in response to the synchronous pulse being provided; and
- asserting, by the adaptive pulse synchronizer, a synchronous ready signal after the asynchronous data input is latched to the synchronous data output.

15. The method of claim 14, further comprising negating the second logic signal in response to the leading edge of the synchronous pulse being provided.

16. The method of claim 14, wherein said providing a leading edge of a synchronous pulse comprises providing the leading edge of the synchronous pulse in response to the clock signal transitioning from a first level to a second level when the second logic signal has been asserted, and wherein said providing a trailing edge of a synchronous pulse comprises providing the trailing edge of the synchronous pulse in response to the clock signal transitioning from the first level to the second level when the second logic signal has been negated.

17. The method of claim 16, wherein said asserting a synchronous ready signal comprises asserting the synchronous ready signal in response to the clock signal transitioning from the second level to the first level during the synchronous pulse.

18. The method of claim 14, further comprising:
- preventing the first logic signal and the second logic signal from being asserted before the request signal is provided;
- preventing the leading and trailing edges of the synchronous pulse from being provided before the request signal is provided; and
- preventing the latching of the asynchronous data input to the synchronous data output before the request signal is provided.

* * * * *